Feb. 23, 1954    W. M. GREGG    2,670,202
REEL FOR MOTION-PICTURE FILM
Filed Nov. 24, 1950    2 Sheets-Sheet 1

INVENTOR
Ward M. Gregg
BY
ATTORNEYS

Feb. 23, 1954
W. M. GREGG
2,670,202
REEL FOR MOTION-PICTURE FILM
Filed Nov. 24, 1950
2 Sheets-Sheet 2
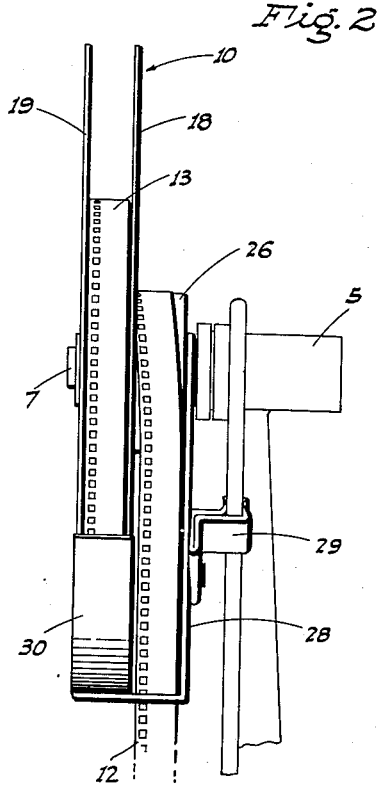
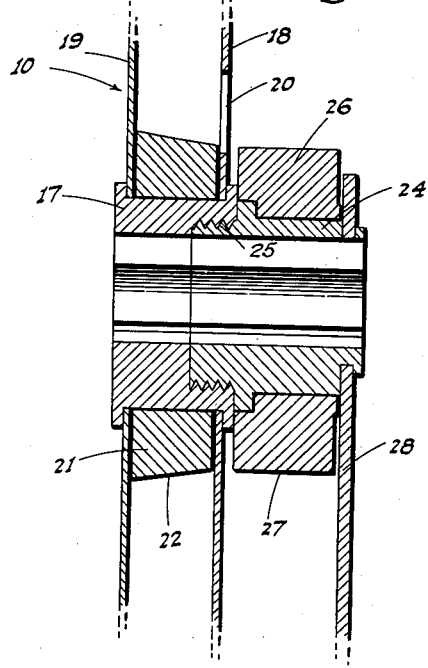
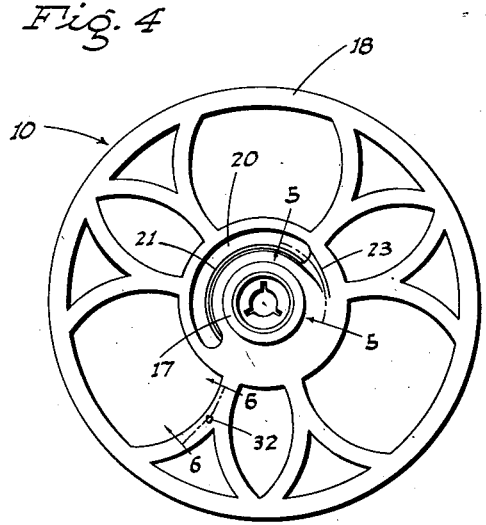
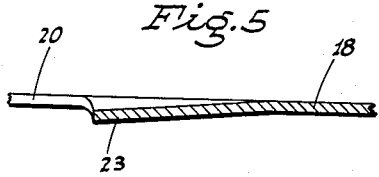
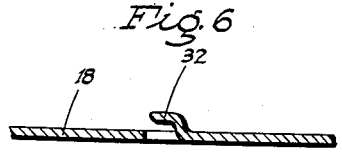
INVENTOR
Ward M. Gregg
BY
ATTORNEYS Patented Feb. 23, 1954

2,670,202

UNITED STATES PATENT OFFICE 2,670,202

REEL FOR MOTION-PICTURE FILM

Ward M. Gregg, Lodi, Calif.

Application November 24, 1950, Serial No. 197,342

6 Claims. (Cl. 271—2.17)

1

This invention is directed to, and it is a major object to provide, an improved reel for motion picture film; the reel being especially designed, but not limited, for use on a portable or home-type projector.

Another important object of the invention is to provide a reel, for motion picture film, which eliminates the necessity of rewinding the film from one reel to another after each showing; the reel being of novel construction which permits the film to feed from the inside of the coil on one reel for showing, while progressively winding onto the outside of the other reel of the usual pair. By feeding from the inside of the coil on one reel and winding onto the outside of the coil on the other reel, no rewinding is necessary before re-use of the film; the pair of reels being of like construction, and all that is required to re-use the film is to reverse the reels between film winding position and film feeding position on the projector.

A further object of the invention is to provide a reel, for the purpose described, which is of novel construction; there being effective instrumentalities included to hold the reel stationary when in film feeding position, to rotatably support the coil of film in the reel, and to guide the film as it feeds from the inside of the coil laterally out of the reel adjacent the hub thereof.

An additional object of the invention is to provide an improved reel, for motion picture film, which is adapted for use on conventional projectors without structural change of the same.

Still another object of the invention is to provide a reel for motion picture film, which is designed for ease and economy of manufacture.

A still further object of the invention is to provide a reel for motion picture film, which is practical and reliable, and yet exceedingly effective for the purpose for which it is designed.

These objects are accomplished by means of such structure and relative arrangement of parts as will fully appear by a perusal of the following specification and claims.

In the drawings:

Fig. 2 is a fragmentary front elevation of the reel which is in film feeding position.

Fig. 3 is an enlarged fragmentary sectional elevation of the reel detached; the view showing the central portion or hub and roller assembly of said reel.

Fig. 4 is a side elevation of the reel, detached.

Fig. 5 is a fragmentary cross section on line 5—5 of Fig. 4.

2

Figure 1:
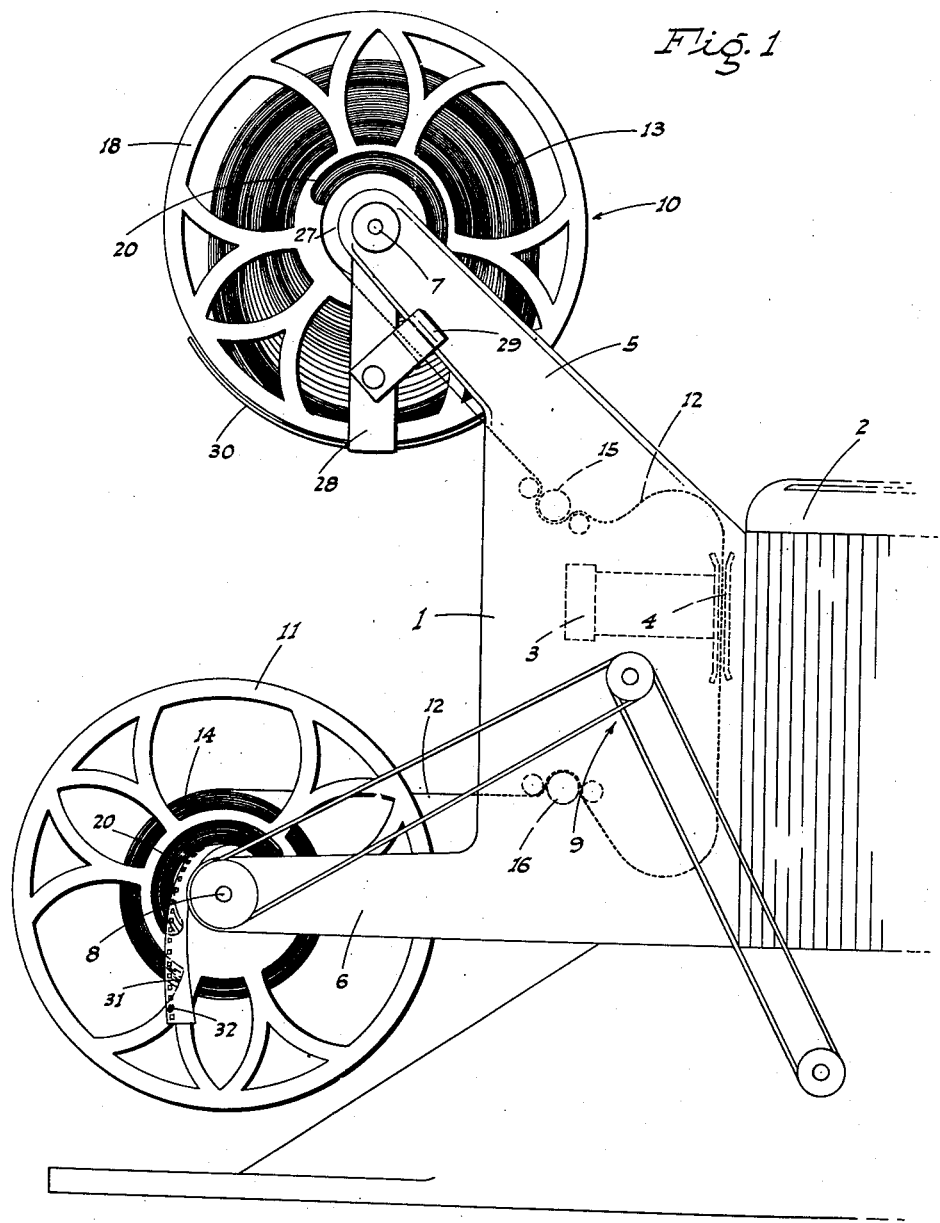
Fig. 1 is a somewhat diagrammatic side elevation of a projector as in use with a pair of reels embodying the present invention.

Fig. 6 is a fragmentary cross section on line 6—6 of Fig. 4.

Referring now more particularly to the characters of reference on the drawings, the improved reel is adapted to be used, in a pair, in connection with a motion picture projector of conventional portable type, as shown in Fig. 1. Such a projector includes a body 1; a lamp housing 2; a projection lens 3; and a film gate 4 between the lamp housing 2 and said lens 3.

Upper and lower reel supporting arms 5 and 6 project forwardly from the body 1, and said arms carry upper and lower laterally projecting reel mounting spindles 7 and 8, respectively; the lower spindle 8 being driven by means indicated generally at 9. The upper or film feeding reel 10 is supported on the upper spindle 7, while the lower or film winding reel 11 is supported on the lower spindle 8.

In order to prevent the necessity of rewinding the film after each showing thereof, the present invention contemplates the feeding of the film 12 from the inside of the coil 13 on the reel 10, and the winding of such film onto the outside of the coil 14 on the reel 11. Thus, after the film is run, it is only necessary to reverse the reels 10 and 11 for the next showing, and which may be accomplished without any rewinding of said film.

The film between the coils 10 and 11 is threaded in engagement with the conventional feed sprockets 15 and 16 of the projector, and intermediate said sprockets the film works through the film gate 4.

As the pair of reels 10 and 11 are identical in construction, a description of one will suffice; the description, at present, being related to the reel 10 as mounted on the upper spindle 7 for feeding of the film 12 through the projector.

The reel comprises a main hub 17 from which spaced end plates 18 and 19 radiate, such end plates being of open or skeleton design, as shown. The hub 17 engages on the upper spindle 7 to support the reel in film feeding position; the reel when in such position being held stationary or non-rotatable in the manner as will hereinafter appear.

The end plate 18 is formed, adjacent but short of the main hub 17, with a circumferentially elongated, arcuate slot 20 of substantially half circular extent concentric to the hub axis.

Between the end plates 18 and 19 the main hub 17 supports a free running roller 21, whose face 22 inclines laterally in the direction of the slot 20, registering therewith.

The lateral edge of the face 22 adjacent the slot 20 is close to the radially innermost edge of said slot (see Fig. 3), whereby the film 12, feeding from the inside of the coil 13 on the reel, may deliver freely through said slot 20; the inclination of the face 22 enhancing such feeding action of the film.

The slot 20 is disposed generally in an uppermost position when the reel is in use in its stationary film feeding position.

In order to prevent the edge of the film 12 from being abraded as it feeds through the slot 20, there is an outwardly deformed portion 23 on said one plate longitudinally beyond one end of the slot, with said deformed portion extending contra to the direction of film motion through said slot.

An extension hub 24 is removably secured to the main hub 17 by threading engagement, as at 25, and said extension hub 24 projects axially outwardly from hub 17 at the end adjacent plate 18.

The extension hub 24 carries a free running roller 26 having a horizontal face 27; the film 12, as it feeds from the inside of the coil 13 through the slot 20, running on the roller 26 in guided relation. From the roller 26 the film 12 extends downwardly along the upper reel supporting arm 5 and threads through the feed sprocket 15. It will thus be recognized that the film may be fed effectively from the inside of the coil 13 to the projector mechanism; said coil 13 rotating about the hub 17 as the film feeding continues, which rotation is aided by the roller 21.

In order to maintain the reel 10 against rotation, the extension hub 24 is fixed with a radial holding arm 28 having a clip 29 pivoted thereto; the holding arm 28 depending from the extension hub 24 and the clip 29 frictionally but releasably engaging the upper reel supporting arm 5. With this arrangement the reel 10 is effectively held against rotation.

An arcuate guard 30 is fixed in connection with the radial holding arm 28, and extends about the lower peripheral portion of the reel 10 whereby to prevent any portion of the coil 13 from escaping below said reel.

After a film is shown, i. e. run from the inside of the coil 13 of the reel 10 through the projector and then wound onto the outside of the coil 14 of the reel 11, the reels are merely reversed in position, whereupon the film may again be run without the necessity of rewinding. When the reels are so reversed in position the extension hub 24 is threaded out of the main hub 17 of the reel 10, and rethreaded into the corresponding hub of the reel 11.

When the film 12 is being wound onto the lower or film winding reel 11, which reel is driven by the lower spindle 8, as is conventional, the inner end 31 of such film extends through the related slot 20 and is anchored to the adjacent end plate 18 by means of a small hook 32 struck out from such plate. In this way the coil 14 cannot free-turn in the reel 11 while the film is being wound onto the latter.

It will be noted that while a pair of the special reels constitute a complete set, only one attachment (which includes extension hub 24) is necessary.

With the described reel the handling and showing of motion picture film in portable projectors is greatly simplified by reason of the avoidance of the necessity of rewinding the film after each showing thereof; the structure of the reel being such that the film may feed from the inside of the coil without damage to the film and without entanglement or obstruction. At the same time these special reels without said attachment may be used the same as ordinary reels, and the film run onto and off the reels in the conventional manner on a projector in which the upper spindle 7 is then driven as usual.

The reel is thus very practical and reliable for the intended purpose.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a motion picture projector having a body provided with a reel-supporting arm, and a spindle projecting laterally from the arm; a reel for a coil of film comprising a hub for engagement on the spindle, spaced end plates radiating from the hub, one end plate having an aperture therein adjacent the hub, the film being adapted to feed from the inside of a coil on the reel through said aperture, an element projecting from the reel for engagement with said arm to prevent rotation of the reel, and means mounting said element for detachment from the reel to permit of rotary use of reel in a film winding position on the projector.

2. In a motion picture projector having a body provided with a reel-supporting arm, and a spindle projecting laterally from the arm; a reel for a coil of film comprising a hub for engagement on the spindle, spaced end plates radiating from the hub, one end plate having an aperture therein adjacent the hub, the film being adapted to feed from the inside of a coil on the reel through said aperture, an extension hub removably and non-turnably secured to and projecting axially outward from the reel hub at the end adjacent said one plate, a holding arm radiating from and rigid with the extension hub, and a stop element on the holding arm adapted to engage the reel supporting arm to prevent rotation of the reel.

3. In a motion picture projector having a body provided with a reel-supporting arm, and a spindle projecting laterally from the arm; a reel for a coil of film comprising a hub for engagement on the spindle, spaced end plates radiating from the hub, one end plate having a circumferential slot therethrough adjacent the hub, the film being adapted to feed from the inside of a coil on the reel through the slot, and a roller on the hub for said coil of film; the face of the roller inclining laterally in the direction of the slot and being in register with the latter, there being means to prevent rotation of the reel when mounted on the spindle.

4. In a motion picture projector having a body provided with a reel-supporting arm, and a spindle projecting laterally from the arm; a reel for a coil of film comprising a hub for engagement on the spindle, spaced end plates radiating from the hub, one end plate having a circumferential slot therethrough adjacent the hub, the film being adapted to feed from the inside of a coil on the reel through the slot, a roller on the hub for said coil of film, the face of the roller inclining laterally in the direction of the slot and being in register with the latter, an extension hub removably secured to and projecting outward from the reel hub at the end adjacent said one plate, and a film guiding roller non-removably mounted on the extension hub; the face of said guiding roller alining with the small end of the first named roller, there being means to prevent rotation of the reel when mounted on the spindle.

5. A reel, for a coil of motion picture film, adapted to be mounted on a spindle projecting laterally from a reel supporting arm of a projector; said reel comprising a hub for engagement on the spindle, spaced end plates radiating from the hub, one end plate having a circumferential slot therethrough adjacent the hub, the film being adapted to feed from the inside of a coil on the reel through the slot, a roller on the hub for said coil of film, the face of the roller inclining laterally in the direction of the slot and being in register with the latter, an extension hub removably secured to and projecting outward from the reel hub at the end adjacent said one plate, a film guiding roller on the extension hub, a holding arm radiating from the extension hub, and a stop element on the holding arm adapted to engage the reel supporting arm to prevent rotation of the reel.

6. A reel, as in claim 5, in which said stop element is a reel supporting arm engaging clip.

WARD M. GREGG.

References Cited in the file of this patent

UNITED STATES PATENTS

| Number | Name | Date |
|---|---|---|
| 959,675 | Woodworth | May 31, 1910 |
| 1,024,790 | Lake | Apr. 30, 1912 |
| 1,135,846 | Rickon | Apr. 13, 1915 |
| 1,331,578 | Rosenfield | Feb. 24, 1920 |
| 2,171,991 | Rall | Sept. 5, 1939 |
| 2,290,082 | Wandel | July 14, 1942 |
| 2,380,790 | Robertson | July 31, 1945 |
| 2,473,074 | Reynolds | June 14, 1949 |
| 2,540,897 | Lindeman | Feb. 6, 1951 |